United States Patent
Montalban

(10) Patent No.: US 11,415,815 B2
(45) Date of Patent: Aug. 16, 2022

(54) METHOD FOR THE ASSEMBLY OF ELASTIC HINGES ON AN EYEGLASS FRAME

(71) Applicant: Visottica Industrie S.P.A., Susegana (IT)

(72) Inventor: Rinaldo Montalban, Venice (IT)

(73) Assignee: VISOTTICA INDUSTRIE S.P.A., Susegana (IT)

(*) Notice: Subject to any disclaimer, the term of this patent is extended or adjusted under 35 U.S.C. 154(b) by 336 days.

(21) Appl. No.: 16/816,377

(22) Filed: Mar. 12, 2020

(65) Prior Publication Data
US 2020/0292844 A1  Sep. 17, 2020

(30) Foreign Application Priority Data

Mar. 15, 2019 (IT) .................. 102019000003847

(51) Int. Cl.
G02C 5/22 (2006.01)
G02C 13/00 (2006.01)

(52) U.S. Cl.
CPC .......... *G02C 5/2236* (2013.01); *G02C 13/001* (2013.01)

(58) Field of Classification Search
CPC .. G02C 5/2236; G02C 5/2218; G02C 13/001; G02C 5/22–5/2254
USPC ............... 351/113, 114, 153; 29/11; 16/228
See application file for complete search history.

(56) References Cited

U.S. PATENT DOCUMENTS

| 4,494,834 | A | * | 1/1985 | Tabacchi | G02C 5/2245 351/113 |
| 4,534,628 | A | * | 8/1985 | Morel | G02C 5/2227 351/153 |
| 5,009,495 | A | * | 4/1991 | Williams | G02C 5/008 351/153 |
| 5,515,575 | A | * | 5/1996 | Pinazza | G02C 5/2227 351/113 |
| 5,657,107 | A | * | 8/1997 | Wagner | G02C 5/2236 351/113 |
| 5,755,010 | A | * | 5/1998 | Lehnert | G02C 5/2236 351/113 |

(Continued)

FOREIGN PATENT DOCUMENTS

DE        1093588 B   11/1960
DE  102016007403 A1   12/2017
(Continued)

*Primary Examiner* — Zachary W Wilkes
(74) *Attorney, Agent, or Firm* — Mark M. Friedman

(57) ABSTRACT

Method for the assembly of elastic hinges on an eyeglass frame, wherein each elastic hinge has a first and a second articulation elements hinged around a hinging axis. The method provides for a first step of inserting the first articulation element in a first seat of a temple and, subsequently, a second step of inserting the second articulation element in a second seat of an end piece of the eyeglasses. In the first insertion step, the second articulation element is placed perpendicular to the first articulation element with the hinging axis placed at a first distance from the temple. Before the second insertion step, a tensioning step is provided in which the second articulation element is rotated up to being arranged parallel to the first articulation element, bringing the hinging axis to a second distance from the temple that is greater than the first distance.

7 Claims, 8 Drawing Sheets

(56) References Cited

U.S. PATENT DOCUMENTS

| | | | | |
|---|---|---|---|---|
| 6,050,686 | A * | 4/2000 | De Rossi | G02C 5/2254 351/113 |
| 6,353,965 | B1 * | 3/2002 | Lo | G02C 5/2236 16/327 |
| 6,390,620 | B1 * | 5/2002 | Montalban | G02C 5/2236 351/114 |
| 6,481,053 | B2 * | 11/2002 | Desbiez-Piat | G02C 5/008 351/153 |
| 6,505,933 | B2 * | 1/2003 | Schuchard | G02C 5/2236 351/113 |
| 6,547,389 | B2 * | 4/2003 | Hotellier | G02C 5/2236 351/114 |
| 6,892,422 | B2 * | 5/2005 | Schuchard | G02C 5/2236 351/113 |
| 7,222,960 | B2 * | 5/2007 | Thiele | G02C 5/2236 351/116 |
| 7,452,072 | B2 * | 11/2008 | Tabacchi | G02C 5/10 351/114 |
| 7,637,609 | B1 * | 12/2009 | Ifergan | G02C 5/2236 351/113 |
| 7,798,637 | B2 * | 9/2010 | Medana | G02C 5/2236 351/113 |
| 8,757,796 | B2 * | 6/2014 | Delamour | G02C 5/2236 351/113 |
| 8,826,496 | B2 * | 9/2014 | Niu | G02C 5/2245 16/228 |
| 8,978,204 | B2 * | 3/2015 | Hotellier | G02C 5/2245 16/228 |
| 9,459,466 | B2 * | 10/2016 | Wang | G02C 5/146 |
| 10,054,801 | B2 * | 8/2018 | Montalban | G02C 5/22 |
| 10,061,141 | B2 * | 8/2018 | Delamour | G02C 5/2263 |
| 10,302,971 | B2 * | 5/2019 | Montalban | G02C 5/2236 |
| 10,642,065 | B2 * | 5/2020 | Montalban | G02C 5/2245 |
| 10,928,650 | B2 * | 2/2021 | Montalban | G02C 5/2227 |
| 10,928,651 | B2 * | 2/2021 | Montalban | G02C 5/2245 |
| 2001/0038436 | A1 | 11/2001 | Schuchard et al. | |
| 2008/0266518 | A1 * | 10/2008 | Niu | G02C 5/2236 351/153 |
| 2009/0047061 | A1 * | 2/2009 | Chene | G02C 5/2236 403/65 |
| 2014/0022503 | A1 | 1/2014 | Kheang | |
| 2017/0139229 | A1 * | 5/2017 | Montalban | B29C 65/56 |
| 2019/0146241 | A1 * | 5/2019 | Hongzhi | G02C 5/2236 16/228 |
| 2019/0265511 | A1 * | 8/2019 | Delamour | G02C 5/2263 |

FOREIGN PATENT DOCUMENTS

| | | | | |
|---|---|---|---|---|
| EP | 0166822 | A2 * | 1/1986 | G02C 5/2227 |
| EP | 1090324 | A1 | 4/2001 | |
| EP | 1090324 | B1 * | 7/2006 | G02C 5/2227 |
| FR | 2641382 | A1 * | 7/1990 | G02C 5/2236 |
| FR | 3021126 | A1 * | 11/2015 | G02C 5/10 |
| IT | 201800002345 | A1 | 8/2019 | |
| WO | WO-9411606 | A1 * | 5/1994 | E05D 11/105 |
| WO | WO-9629623 | A1 * | 9/1996 | G02C 5/2236 |
| WO | WO-2004040355 | A1 * | 5/2004 | G02C 5/2236 |

* cited by examiner

METHOD FOR THE ASSEMBLY OF ELASTIC HINGES ON AN EYEGLASS FRAME

FIELD OF APPLICATION

The present invention regards a method for the assembly of elastic hinges on a frame. The present elastic hinge is advantageously intended to be employed in a method for assembly of plastic frames for eyeglasses and in particular it is susceptible of being mounted on frames made by means of three-dimensional molding of plastic material. Therefore, the hinge, object of the present invention, is inserted in the industrial field of eyewear, or rather of the production of eyeglasses and of accessories and components for eyeglasses.

STATE OF THE ART

As is known, in the eyewear field, hinges are employed for articulating the temples to the front of a frame. Each hinge is usually formed by two articulation elements pivoted to each other, of which, respectively, a first element is fixed to a temple and a second element is fixed to a lateral portion of the front of the frame, known in the technical jargon of the field with the term "end piece".

In operation, hinges allow the temples to rotate between a closed position, in which they are collected on the front of the eyeglasses, and an open position, in which they assume a position that is substantially right-angle with respect to the front, adapted to allow the use thereof on the face of the user.

In particular, the present invention refers to hinges of known type termed "elastic", i.e. adapted to allow moving the temples between the aforesaid closed and open positions by overcoming a contrast force exerted by a spring associated with the hinge.

The elastic hinges of known type allow the user to more easily put on eyeglasses, since the temples can also be moved into an extra-open position, placed beyond the aforesaid open position, in order to then be released on the head of the user once the eyeglasses have been put on, so as to exert a slight pressure thereon. Such pressure allows the temples to be maintained always adherent on the head of the user, ensuring an optimal stability of the eyeglasses in the various use conditions.

Frames for eyeglasses are known that are made by means of three-dimensional molding processes, starting from suitable plastic materials such as: acrylonitrile butadiene styrene (ABS), acrylonitrile styrene acrylate (ASA), polycarbonate (PC), polycarbonate acrylonitrile butadiene styrene (PC-ABS), nylon, carbon-filled nylon (CF Nylon) or even liquid resins such as photopolymers and resins for laser stereography.

The aforesaid plastic materials usable in the three-dimensional molding processes have an important drawback tied to the fact of being provided with a lower elastic return than that of the materials conventionally employed in the eyeglass field, such as acetate. The reduced elastic return of such plastic materials employable in three-dimensional molding processes has the drawback of not allowing the elastic hinges to be firmly anchored to the temple. Indeed, such plastic materials are susceptible of being deformed during the insertion of the elastic hinge in the temple, thus widening the seat in which the elastic hinge is inserted and preventing the latter from gripping the walls of the seat itself.

For the purpose of overcoming the aforesaid drawback, elastic hinges are known, for example of the type described in the patent IT102018000002345, which are provided with retention means susceptible of being deformed subsequent to the insertion of the hinge in the seat of the temple, by embedding the temple in the plastic material with which it is made and stably engaging the hinge at its interior. Also such solution of known type has however demonstrated in practice that it does not lack drawbacks.

One drawback of such solution results from the fact that, even if such hinge allows an easy grasping of the temple, it is however not aimed for allowing an analogous grasping of the end piece of the eyeglasses, which is also advantageously made by three-dimensional molding and thus has the same drawbacks as the temples.

In particular, the end piece of eyeglasses generally has a longitudinal extension that is smaller than the temple and is poorly adapted to a hinge of the above-described known type, which is instead provided with greater longitudinal extensions.

A further drawback that is encountered in the assembly of elastic hinges on frames made with three-dimensional molding processes lies in the fact that the seats made in the temple and in the end piece of the eyeglass frame, which are intended to house the articulation elements of the hinge, are generally made in a non-precise manner and do not allow an optimal coupling with the articulation element itself.

In particular, the three-dimensional molding processes of known type are unable to produce eyeglass frames in a very precise manner, and generally have rather high tolerances. Consequently, also the seats of the articulation elements of the hinge, being made simultaneously with the frame itself, are affected by such high tolerances, and hence they do not allow a precise insertion of the articulation element of the hinge at their interior.

A further drawback of the elastic hinges of known type lies in the fact that, during the step of assembly on the frame, they require preloading the spring in order to allow the passage between the different abovementioned positions of the temple, overcoming the contrast force exerted by the spring itself.

Such operation of preloading the spring has demonstrated in practice to be complex to attain, especially in the case of frames obtained with three-dimensional molding.

Indeed, while metal or plastic frames not obtained with three-dimensional molding allow attaining the preloading of the spring, forcing the alignment between the holes of the two hinge components by means of the insertion of the hinge pin, in the case of plastic frames obtained with three-dimensional molding it is not advantageous to attain the preloading with such method since the tolerances on the plastic of the frame do not allow adjusting such preload with due precision.

Therefore, in the eyeglass field, there is a considerable need to provide a method for the assembly of elastic hinges on eyeglass frames which allows carrying out an easy and precise preloading of the spring and which can also be executed on frames attained by means of processes of three-dimensional molding of plastic materials.

The document DE 1093588 describes a different type of elastic hinge which comprises a female element coupled to the temple and provided with two shoulders, between which the opening of a seat is made in which a spring is inserted, at whose external end a ball is placed. The hinge also comprises a male element coupled to the front of the frame and provided with a head inserted between the shoulders of the female element acting in abutment against the aforesaid ball in order to compress the spring. The mounting of such hinge of known type simply requires inserting the head of the male element between the shoulders of the female element (by acting in compression against the ball and hence against the spring) until the holes of the two elements are aligned in a such that a hinging screw can be inserted therein.

Presentation of the Invention

In this situation, the problem underlying the present invention is to eliminate the drawbacks of the abovementioned prior art, by providing a method for the assembly of elastic hinges on an eyeglass frame that is simple to make.

A further object of the present invention is to provide a method for the assembly of elastic hinges on an eyeglass frame that allows executing the preloading of the elastic hinges themselves in a particularly facilitated manner.

BRIEF DESCRIPTION OF THE DRAWINGS

The technical characteristics of the present invention, according to the aforesaid objects, and the advantages thereof will be more evident in the following detailed description, made with reference to the enclosed figures, which represent a merely exemplifying and non-limiting embodiment of the invention in which:

FIG. 5 shows a first stage of such first insertion step, in which the retention element of the elastic hinge is placed in a non-operative position A in order to not interfere with the internal walls of the first seat of the temple;

DETAILED DESCRIPTION OF SEVERAL PREFERRED EMBODIMENTS

Figure 1:
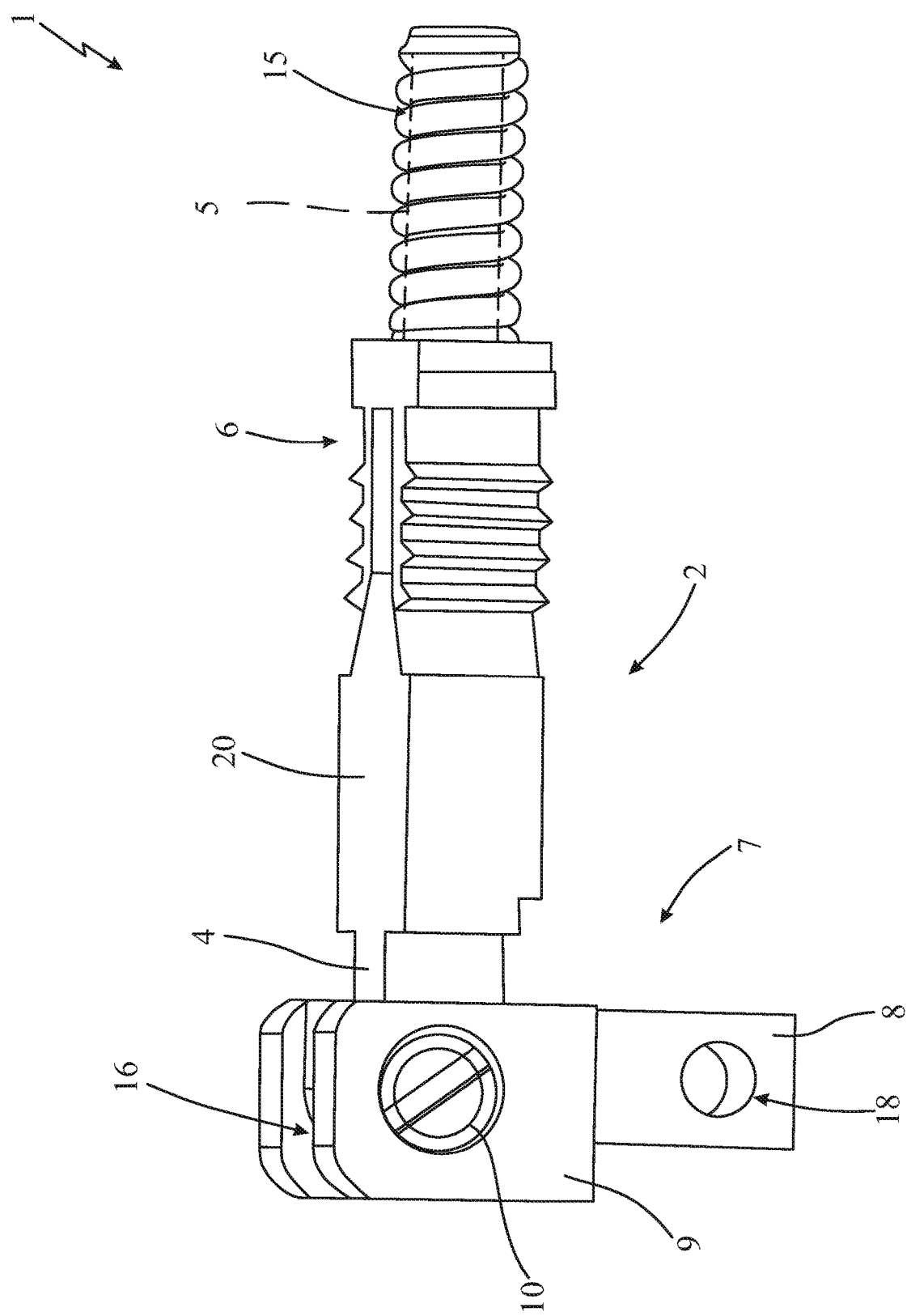
FIG. 1 shows a perspective view of the elastic hinge according to the present invention.

The method for the assembly of elastic hinges on an eyeglass frame, object of the present invention, will be described hereinbelow with reference to an elastic hinge susceptible of being employed in the aforesaid method, it too forming the object of the present invention.

With reference to the enclosed drawings, reference number 1 overall indicates the elastic hinge employable in the method, object of the present invention.

Advantageously, the elastic hinge 1, according to the present invention, is intended to be assembled on frames for eyeglasses of conventional as well as sports type and is adapted to mutually articulate, in a per se known manner, a temple 100 with respect to an end piece 200 of the eyeglass frame with which it is assembled.

More in detail, the elastic hinge 1 according to the invention is advantageously made of metal material, such as steel, and is intended to be assembled on an eyeglass frame made of plastic, e.g. of a cellulose resin such as cellulose acetate, optyl, polyamide, nylon or polycarbonate or even advantageously plastic materials used in three-dimensional molding processes.

Although the method and the hinge, object of the present invention, are particularly adapted to be employed with frames obtained via three-dimensional molding, these can also be employed with more conventional frames not obtained with three-dimensional molding, for example made of acetate.

More in detail, the eyeglass frame referred to in the present document is of the type formed by a front, intended to support a pair of lenses connected in the central part by a bridge, susceptible of resting on the nose of the user, and by a pair of temples 100 pivoted by means of a corresponding elastic hinge 1 to the sides of the front and, more precisely, to two lateral portions thereof directed towards the rear part of the eyeglasses and known in the technical jargon of the field with the term "end piece" 200.

In operation, each temple 100 can be moved, due to the corresponding elastic hinge 1, at least between a closed position, in which it is collected on the front of the eyeglass frame, and an open position, in which it assumes a position that is substantially right-angle with respect to the front of the eyeglass frame.

Advantageously, moreover, the present elastic hinge 1 is adapted to allow moving the temple 100 even up to an extra-open position, in which the temple 100 itself is forced beyond the aforesaid open position along an extra-opening travel. In addition, the elastic hinge 1 is advantageously adapted to exert an elastic return force on the temple 100, aimed to allow the eyeglasses to be easily put on and aimed to ensure a better fit of the same once placed on the head of the user.

The present elastic hinge 1 comprises a first articulation element 2, susceptible of being inserted in a first seat 101 of a temple 100, a second articulation element 7, susceptible of being inserted in a second seat 201 of an end piece 200, and a hinge pin 10 placed as a rotatable connection between such articulations around a hinging axis Z.

More in detail, the first articulation element 2 is provided with a main extension along a first longitudinal axis Y, the second articulation element 7 is provided with an extension along a second longitudinal axis X and the hinging axis Z, along which the hinge pin 10 is extended, is perpendicular to the first and second longitudinal axes Y, X.

In particular, when the temple 100 is in open position, the second longitudinal axis X of the second articulation element 7 is substantially parallel to the first longitudinal axis Y of the first articulation element 2. Suitably, when the temple 100 is in closed position, the second longitudinal axis X of the second articulation element 7 is substantially perpendicular to the first longitudinal axis Y of the first articulation element 2.

More in detail, the first articulation element 2 is advantageously a male element and is intended to be slidably engaged with the first seat 101 of the temple 100. In addition, the second articulation element 7 is advantageously a female element and is intended to be mechanically engaged with the second seat 201 of the end piece 200, and such second seat 201 is susceptible of opposing the corresponding first seat 101 with the temple 100 associated with the end piece 200 by means of the elastic hinge 1.

The first and the second articulation element 2, 7 are thus susceptible of rotating with respect to each other around the hinging axis Z, driving the temple 100 and the end piece 200 with which they are engaged in relative rotation with respect to each other.

According to the invention, moreover, the first articulation element 2 is provided with an elastic carriage 3 provided with a first hole 31, and the second articulation element 7 is provided with at least one second hole 14, intended to be placed aligned with the first hole 31 along the hinging axis Z, with the hinge pin 10 placed to traverse such first and second holes 31, 14 in order to rotatably connect together the first and the second articulation elements 2, 7.

More in detail, the elastic carriage 3 of the first articulation element 2 is extended along the first longitudinal axis Y between a hinging head 4, in which the first hole 31 is advantageously made, and an elongated portion 5.

The second articulation element 7 is preferably provided with a base body 8, advantageously substantially box-like, and with at least two shoulders 9 extended from the base body 8 and integral with the latter. The aforesaid two shoulders 9 are substantially parallel to each other and preferably parallel to the second longitudinal axis X; in addition, they delimit a slit 16 between them, it too parallel to the second longitudinal axis X, in which the hinging head 4 is inserted.

In particular, the second hole 14 of the second articulation element 7 is made in at least one of the aforesaid shoulders 9, and preferably it is made in both shoulders 9. More in detail, the two second holes 14 are aligned with each other along the hinging axis Z and preferably are centered with respect to the latter. In addition, such second holes 14 are advantageously made in a manner passing through the corresponding shoulder 9 in order to house the hinge pin 10. In particular, the hinge pin 10 is advantageously placed to traverse the second hole 14 of one of the two shoulders 9, the first hole 31 of the hinging head 4 and the second hole 14 of the remaining shoulder 9.

The second articulation element 7 is also provided with a cam profile 17, preferably made at the shoulders 9 and susceptible of abutting against the temple 100 during the relative rotation of the temple 100 with respect to the end piece 200.

The aforesaid cam profile 17 is provided with at least one first face 11, susceptible of abutting against the temple 100 in a first step of inserting the elastic hinge 1 in the eyeglass frame, as will be specified hereinbelow with reference to the method for the assembly of the present elastic hinge 1 on an eyeglass frame. More in detail, the aforesaid first face 11 is susceptible of abutting against the temple 100 with the second articulation element 7 placed in a mounting position, with the second longitudinal axis X substantially perpendicular to the first longitudinal axis Y.

In addition, the cam profile 17 is provided with a second face 12, susceptible of abutting against the temple 100 with the second articulation element 7 placed in open position, with the second longitudinal axis X substantially parallel to the first longitudinal axis Y. Advantageously, moreover, the cam profile 17 is provided with a third face 13 susceptible of abutting against the temple 100 with the latter placed in the closed position, with the second longitudinal axis X substantially perpendicular to the first longitudinal axis Y.

More in detail, as better specified hereinbelow, the second articulation element 7 is intended to be placed with its second longitudinal axis X substantially perpendicular to the first longitudinal axis Y of the first articulation element 2, both in the closed position and in the mounting position, and in particular, in the mounting position it is susceptible of being directed in the direction opposite the closed position. In operation, therefore, in order to pass from the mounting position to the closed position, the second articulation element 7 is susceptible of rotating 180 degrees around the hinging axis Z.

Preferably, moreover, the aforesaid first, second and third faces 11, 12, 13 of the cam profile 17 are susceptible of abutting against a front end face 102 of the temple 100, starting from which the first seat 101 is advantageously obtained.

Figure 2:
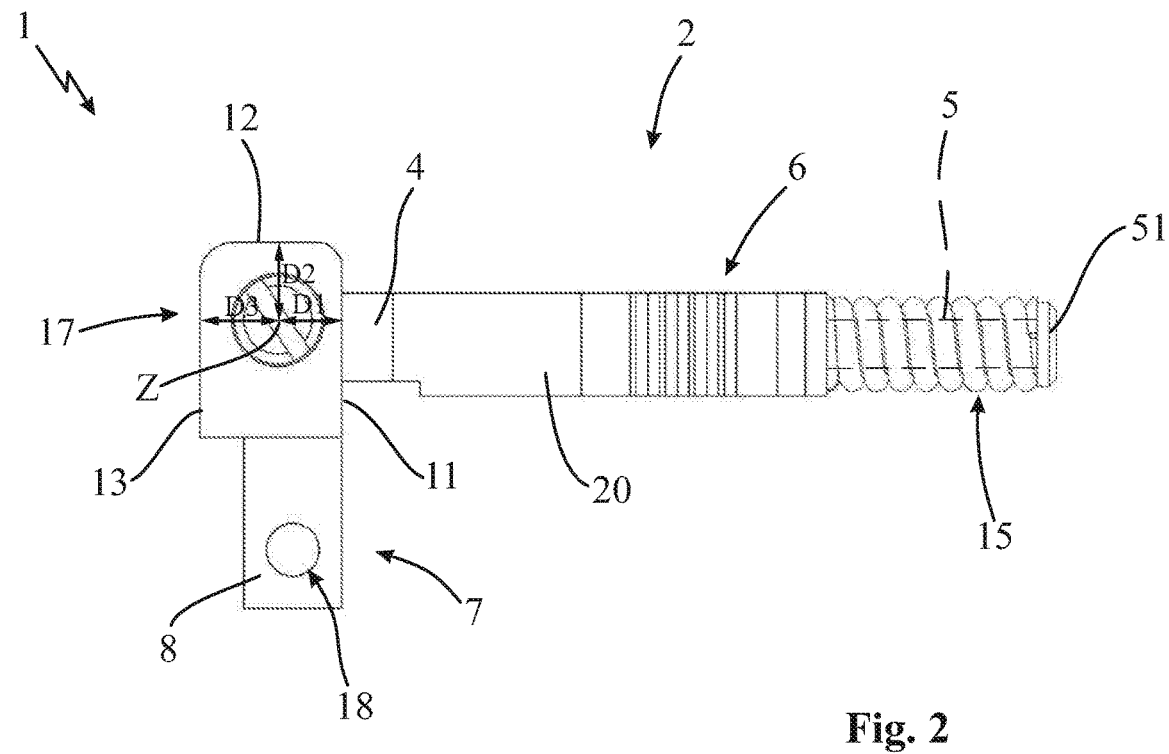
FIGS. 2 and 3 respectively show a side view and a plan view of the elastic hinge of FIG. 1.
Figure 3:
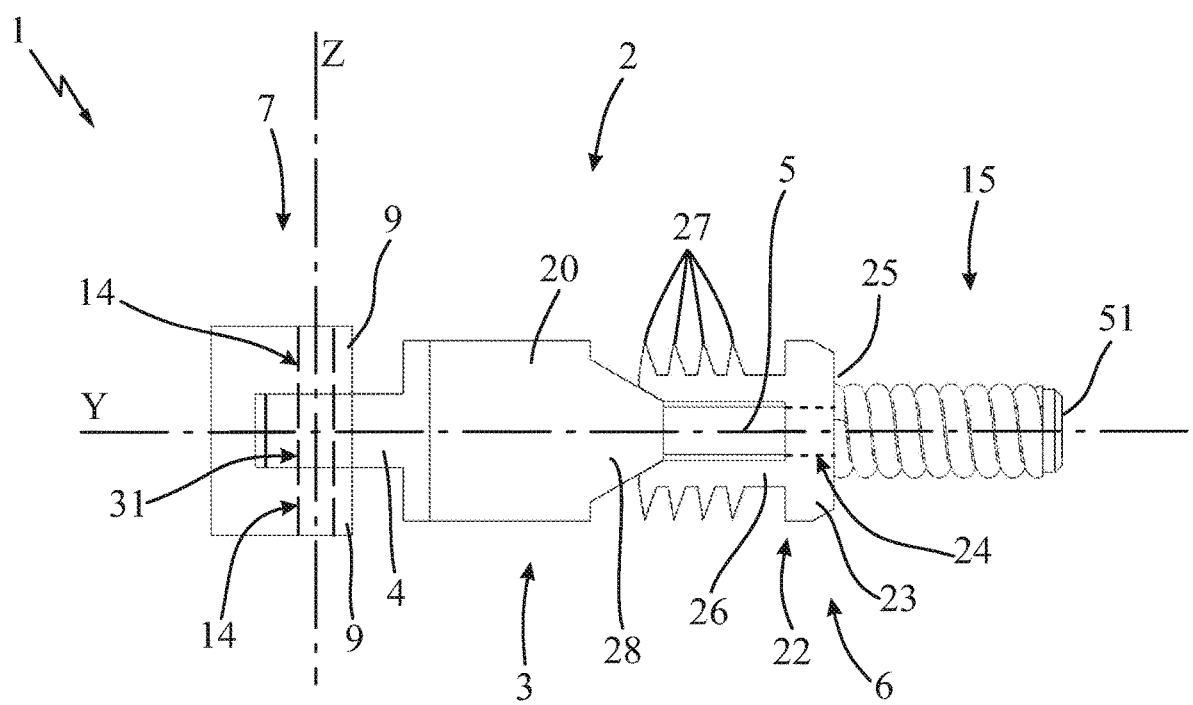

In accordance with the preferred embodiment illustrated in FIG. 2, the faces of the cam profile 17 are substantially flat, placed tilted with respect to each other by about 90 degrees and preferably connected to each other by a curved section in order to allow the cam profile 17 to rotate against the temple 100. In particular, the first and the third faces 11, 13 are advantageously placed substantially parallel to the second longitudinal axis X and are directed in opposite direction with respect to each other. The second face 12 is preferably placed perpendicular to the second longitudinal axis X and is placed to connect between the first and the third faces 11, 13.

In addition, the first face 11 is spaced from the second hole 14 for a first distance D1 and the second face 12 is spaced from the second hole 14 for a second distance D2 greater than the first distance D1 (indicated in the enclosed FIG. 2). Advantageously, moreover, the third face 13 is placed at a third distance D3, also greater than the first distance D1 and preferably equal to the second distance D2. In operation, the cam profile 17 is then adapted to act thrustingly against the front face of the temple 100 in order to space the second hole 14 from the temple 100 itself during a rotation of the second articulation element 7 from the mounting position to the open position and to maintain the second hole 14 at a distance at least equal to the second distance D2 up to the closed position.

In particular, the first distance D1, the second distance D2, and advantageously the third distance D3 are measured from the axis of the second hole 14 (and in particular from the hinging axis Z).

According to the idea underlying the present invention, moreover, the second articulation element 7 is provided with a threaded hole 18, which is susceptible of being placed aligned with a through hole 205 of the end piece 200 with the second articulation element 7 inserted in the second seat 201. In addition, the aforesaid threaded hole 18 is susceptible of being engaged via screwing with a fixing screw 19 placed to mechanically connect the second articulation element 7 to the end piece 200.

More in detail, the second seat 201 is advantageously obtained longitudinally with respect to the end piece 200 and in particular starting from a rear face 202 thereof, susceptible of being directed towards the front face 102 of the temple 100 with the latter associated with the end piece 200 itself. In addition, in accordance with the enclosed FIGS. 8 and 9, the second seat 201 is shaped in a form substantially corresponding to the form of the second articulation element 7, so as to be engaged with the latter by means of shape engagement and prevent the rotation of the second articulation element 7 around the second longitudinal axis X. Clearly, the section of the second articulation element 7 and of the relative second seat 201 could also have any other shape different from the substantially rectangular shape represented, such as polygonal shape, curvilinear shape or still other shapes that can still ensure a shape engagement such to prevent undesired relative rotations around the second longitudinal axis X.

Advantageously, moreover, the through hole 205 is extended between an external wall of the end piece 200 and the second seat 201 at a distance from the rear face 202 such to be aligned with the threaded hole 18 with the second articulation element 7 inserted in the second seat 201.

Advantageously, moreover, the aforesaid threaded hole 18 is made at the base body 8 of the second articulation element 7, preferably parallel to the hinging axis Z and the fixing screw 19 is intended to be inserted in the second hole 205 of the end piece 200 and screwed in the threaded hole 18 of the second articulation element 7 in order to mechanically engage the latter with the end piece 200.

Advantageously, moreover, the base body 8, and preferably the entire second articulation element 7, is made of metal material, such as steel, and the thread of the threaded hole 18 is attained in a precise manner so as to ensure an optimal coupling between the second articulation element 7 and the fixing screw 19, independent of the material and of the production process with which the end piece 200 of the eyeglass frame is made. Advantageously, therefore, the second articulation element 7 is also adapted to be engaged with end pieces 200 made in a not extremely precise manner, such as end pieces 200 made with three-dimensional molding processes.

Figure 8:
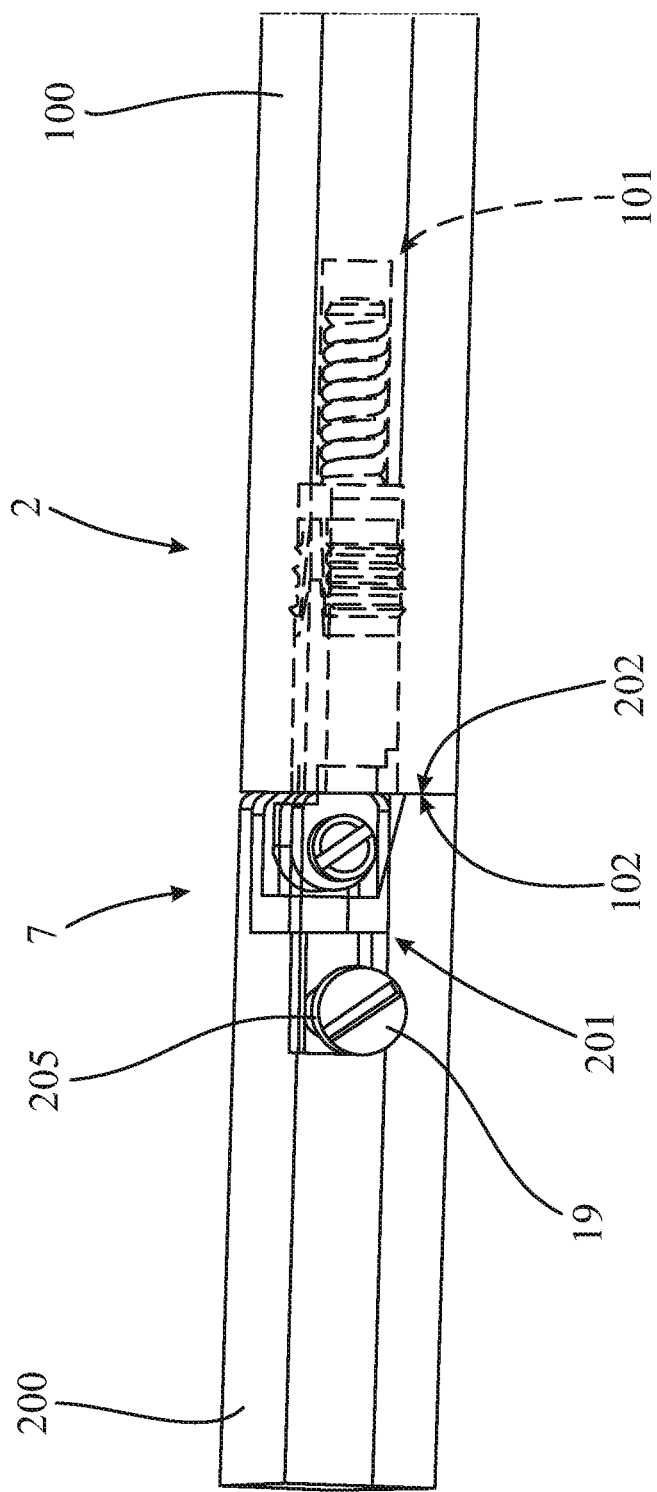
FIG. 8 shows a perspective view of a step of fixing the elastic hinge of FIG. 1 to the end piece of an eyeglass frame.
Figure 9:
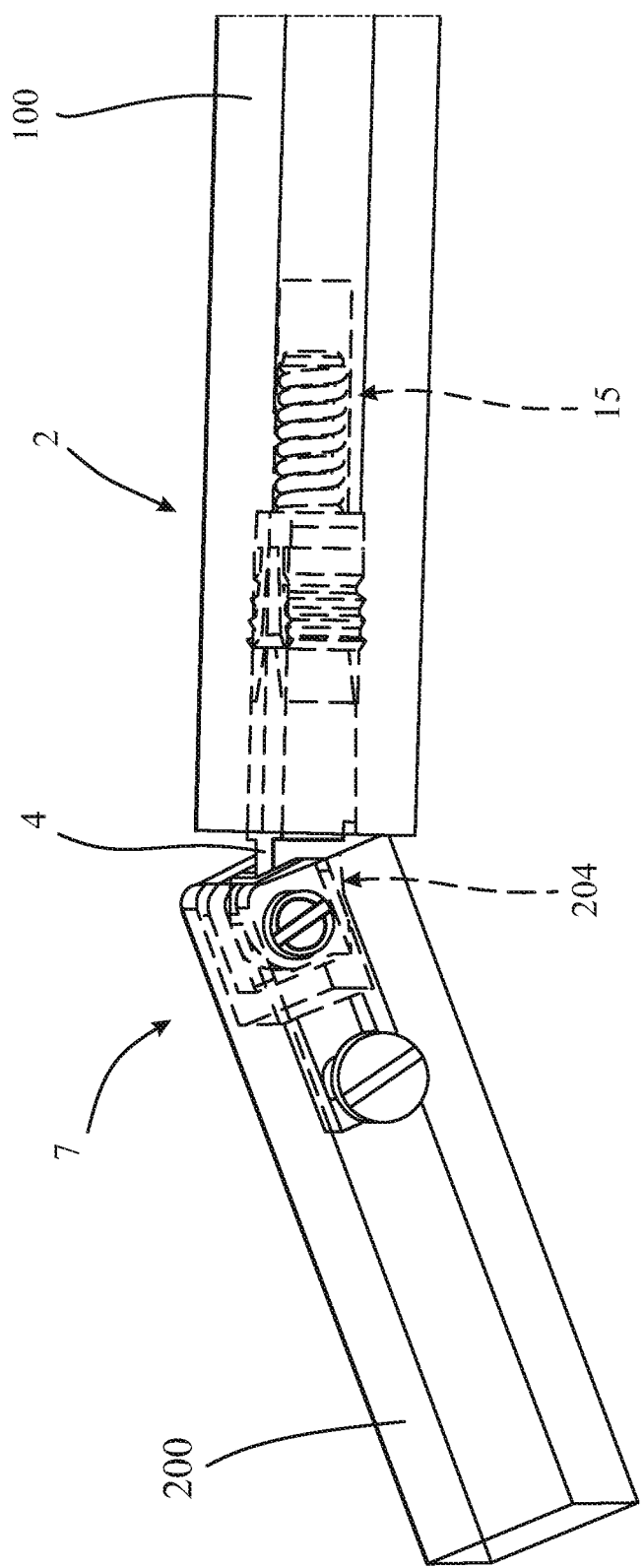
FIG. 9 shows a perspective view of the elastic hinge of FIG. 1 assembled on an eyeglass frame with the present method and placed in an extra-open position.

In accordance with the preferred embodiment, illustrated in the enclosed FIGS. 8 and 9, moreover, the second seat 201 of each end piece 200 is advantageously made at one edge of the end piece 200 itself and is provided with two open faces. More in detail, the aforesaid second seat 201 is substantially shaped in box-like shape and is provided with a first open face, intended to be directed towards the temple 100 with the latter placed in closed position, and is provided with a second open face, which is intended to be directed towards the temple 100 with the latter placed in open position and is preferably obtained at the rear face 202 of the end piece 200.

The second articulation element 7 is therefore advantageously intended to be inserted in the second seat 201 with the third face 13 of the cam profile 17 of each shoulder 9 thereof placed at the first open face of the second seat 200 and with the second face 12 placed at the second open face. In this manner, advantageously, the slit 16 obtained between the two shoulders 9 of the second articulation element 7 also results open on two sides and allows the first articulation element 2 to rotate with respect to the second articulation element 7 between the closed position and the open position.

In addition, the aforesaid slit 16 is thus advantageously closed on its side corresponding to the first face 11 of the cam profile 17. In this manner, once the second articulation element 7 is inserted in the second seat 201, it is no longer possible to place the first face 11 in abutment against the temple 100.

Advantageously, moreover, the second seat 201 of each end piece 200 is provided with a widened portion directed towards the rear face 202, which is preferably defined by a wall 204 that is tilted with respect to a main extension axis of the end piece 200 and directed towards the rear face 202. In operation, such tilted wall 204 of the second seat 201 is adapted to act as an end stop in the extra-opening travel of the elastic hinge 1, as indicated in the enclosed FIG. 9 and as better described hereinbelow. In operation, in fact, the temple 100 associated with the end piece 200 by means of the elastic hinge 1, is susceptible of being rotated up to the extra-open position, in which the first and the second longitudinal axis Y, X are placed tilted with respect to each other.

Advantageously, in such extra-open position, the first articulation element 2 is rotated around the hinging axis Z up to bringing its hinging head 4 in abutment against the tilted wall 204 of the second seat 201, which advantageously acts as extra-open end stop.

As indicated above, moreover, the first articulation element 2 of the elastic hinge 1 is intended to be slidably engaged in the first seat 101 of the temple 100 to be connected to the end piece 200 in order to allow the relative rotation of the latter. In particular, the first seat 101 is made in the temple 100, preferably longitudinally thereto and starting from the front face 102 thereof susceptible of being directed towards the rear face 202 of the end piece 200 with the temple 100 associated with the latter.

Figure 4:
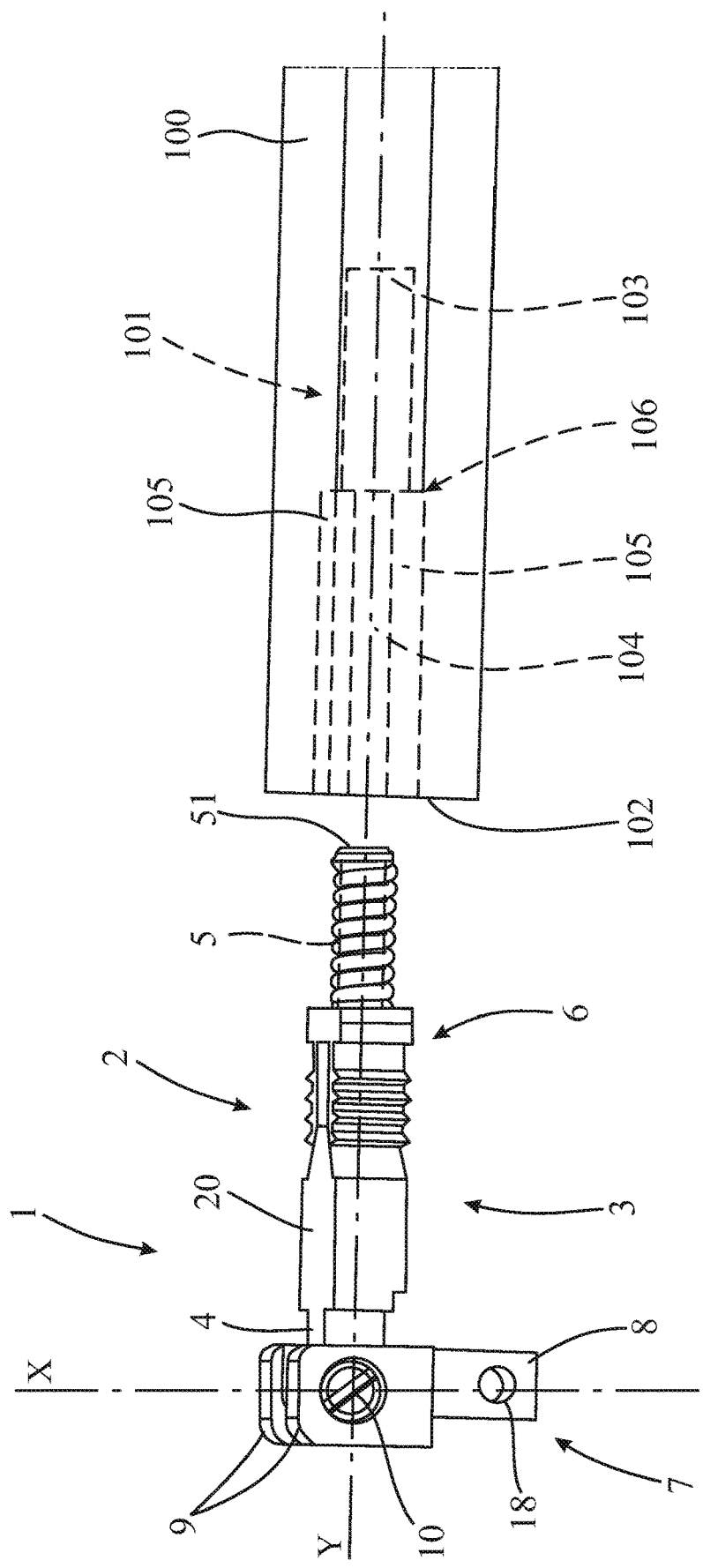
FIG. 4 shows a perspective view of a first step of the method for assembly of the elastic hinge of FIG. 1 on an eyeglass frame according to the present invention, in which the elastic hinge of FIG. 1 and a temple of the eyeglass frame are provided.

Advantageously, in accordance with the enclosed FIG. 4, the first seat 101 is at least partially shaped in parallelepiped form and is delimited by a plurality of internal walls. In particular, the internal walls of the first seat 101 advantageously comprise at least one bottom wall 103, two lateral walls 104 that are substantially vertical and two horizontal walls 105 placed to connect the two lateral walls 104.

As mentioned above, moreover, the first articulation element 2 is provided with the elastic carriage 3 extended along the first longitudinal axis Y between the hinging head 4 and the elongated portion 5, and such elastic carriage 3 is susceptible of sliding in the first seat 101 of the temple 100. In particular, the elastic carriage 3 of the first articulation element 2 is intended to be inserted in the first seat 101 with the first longitudinal axis Y thereof placed parallel to the longitudinal extension axis of the temple 100.

More in detail, in accordance with the preferred embodiment illustrated in the enclosed figures, the elastic carriage 3 is intended to be housed in the first seat 101 with its hinging head 4 placed at least partially outside the first seat 101 itself in order to allow such hinging head 4 to be rotatably coupled to the second articulation element 7.

In accordance with the preferred embodiment illustrated in the enclosed figures, the elastic carriage 3 of the first articulation element 2 also comprises a central body 20, substantially box-like, which is interposed between the hinging head 4 and the elongated portion 5 and is intended to be inserted in the aforesaid first seat 101.

In particular, the central body 20 is advantageously shaped in parallelepiped form and advantageously it is shaped with a form substantially corresponding to the form of the first seat 101 of the temple 100, so as to be engaged with the latter via shaped engagement and to prevent rotations of the elastic carriage 3 around the longitudinal axis Y. Clearly, the section of the central body 20 and of the relative first seat 101 could also have a polygonal shape, curvilinear shape or still other shapes that can ensure a shape engagement such to prevent undesired relative rotations around the first longitudinal axis Y.

Advantageously, moreover, the elongated portion 5 of the slidable carriage 3 is extended starting from the central body 20 up to a widened termination 51, e.g. constituted by the head of a screw, or obtained by means of hammering of the ends of the elongated portion 5 itself.

In particular, the hinging head 4, the central body 20 and the elongated portion 5 of the elastic carriage 3 are advantageously made in a single piece. Or, in a different embodiment, they are made separately and are subsequently fixed to each other to constitute a single body.

In operation, the elastic carriage 3 of the first articulation element 2 is susceptible of sliding forward and backward in the first seat 101 of the temple 100 in order to allow the extra-opening travel of the elastic hinge 1. For such purpose, the elastic carriage 3 advantageously comprises at least one elastic element 15, slidably mounted on the elongated portion 5 of the elastic carriage 3 and in particular interposed between its widened termination 51 and the central body 20. More in detail, the elastic element 15 is advantageously constituted by at least one spring coaxially mounted on the elongated portion 5. Advantageously, such spring is susceptible of being compressed during the sliding of the elastic carriage 3 within the first seat 101 and of exerting an elastic return force, which is aimed to bring the spring back to non-compressed configuration in order to return the elastic carriage 3 within the first seat 101 and to exert a slight pressure on the head of the user who puts on the eyeglass frame.

More in detail, when the temples 100 are rotated around the hinge pin 10, from the closed position towards the open position and up to the extra-open position, there is the partial exit of the elastic carriage 3 from the first seat 101 of the temple 100 with the consequent compression of the spring of the elastic element 15. In particular, in order to reach the open and extra-open positions, the temple 100 is susceptible of being abutted with its front face 102 against the edges of the rear face 202 of the end piece 200, moving the position of the hinging axis Z of the hinge pin 10 away from the first seat 101 of the temple 100, and hence forcing the elastic carriage 3 outward from the first seat 101 against the action of the elastic element 15.

In addition, during such rotation from the closed position towards the extra-open position, the cam profile 17 of the second articulation element 7 is advantageously adapted to thrust against the temple 100, and in particular against its front face 102, in order to force the elastic carriage 3 outward from the first seat 101, against the action of the elastic element 15.

Following the release of the temple 100, the elastic element 15 is then adapted to exert the aforesaid elastic return force in order to bring the elastic carriage 3 back within the first seat 101, bringing the temple 100 back towards the closed position and exerting a slight pressure on the head of the user who puts on the eyeglass frame, so as to ensure a secure fit of the same.

Advantageously, in order to prevent the complete exit of the elastic carriage 3 from the first seat 101 of the temple 100, the first articulation element 2 also comprises at least one retention element 6 placed around the elastic carriage 3 and susceptible of being engaged by means of retention relationship with at least one internal wall of the first seat 101 itself.

More in detail, in accordance with the enclosed figures, the retention element 6 preferably comprises an anchorage body 22 provided with a guide portion 23 provided with a through hole 24. Advantageously, moreover, the elongated portion 5 of the slidable carriage 3 is slidably inserted through the aforesaid through hole 24 and is susceptible of sliding with respect to the guide portion 23, with the anchorage body 22 which remains fixed within the first seat 101 of the temple 100.

In accordance with the enclosed figures, the aforesaid guide portion 23 of the anchorage body 22 preferably has substantially parallelepiped form and is provided with a rear surface 25 directed towards the bottom wall 103 of the first seat 101, against which the elastic element 15 is susceptible of abutting.

In particular, in the preferred embodiment illustrated in the enclosed figures, the elastic element 15 is constituted by a helical spring coaxially mounted on the elongated portion 5 of the elastic carriage 3 and interposed between the aforesaid anchorage body 22 and the widened termination 51 of the elongated portion 5.

In operation, therefore, the aforesaid helical spring is susceptible of being retained in position by the anchorage body 22 of the retention element 6 and of being compressed by the sliding of the elastic carriage 3 outward from the first seat 101 of the temple 100. In addition, the aforesaid helical spring is susceptible of thrustingly acting on the widened termination 51 of the elongated portion 5 of the elastic carriage 3 in order to slide the latter once again towards the interior of the first seat 101.

In accordance with the enclosed figures, the anchorage body 22 of the retention element 6 also comprises at least one retention portion 26, and preferably comprises two retention portions 26, which are projectingly extended from the guide portion 23 towards the central body 20 of the elastic carriage 3 and are provided with at least one projecting tooth 27 susceptible of being engaged by means of retention relationship with one of the internal walls of the first seat 101 of the temple 100.

Advantageously, the first articulation element 2 also comprises an expander body 28, preferably wedge-like, which is mounted on the elongated portion 5 of the elastic carriage 3 and is interposed between the central body 20 and the anchorage body 22. In operation, the aforesaid expander body 28 is susceptible of sliding along the elongated portion 5 starting from a non-operative position A (illustrated in the enclosed FIGS. 1-5), in which it does not interfere with the anchorage body 22 up to an operative position B (illustrated in the enclosed FIGS. 6-9), in which it interferes with the retention portions 26 of the anchorage body 22 in order to deform them, radially expanding them with respect to the first longitudinal axis Y towards one of the internal walls of the first seat 101, and in order to engage the projecting teeth 27 with the temple 100.

In accordance with the preferred embodiment illustrated in the enclosed figures, the aforesaid expander body 28 is integrally made with the central body 20, and still more preferably is made in the form of a projecting portion of the central body 20 itself, which is extended, being tapered, towards the elongated portion 5 of the elastic carriage 3. In operation, the aforesaid projecting portion of the central body 20 is susceptible of sliding, together with the elastic carriage 3, with respect to the guide portion 23 of the anchorage body 22. In addition, in the operative position B, the projecting portion of the central body 20 is susceptible of being inserted between the retention portions 26 of the anchorage body 22 in order to determine the radial expansion of the latter and thus allow the engagement of their projecting teeth 27 with at least one of the internal walls of the first seat 101, and preferably with its lateral walls 104, as illustrated in the enclosed FIG. 6.

Advantageously, moreover, the sliding of the expander body 28 between the retention portions 26 of the anchorage body 22 and the consequent engagement between the projecting teeth 27 and the temple 100 is attained during a first step of inserting the first articulation element 2 in the first seat 101 of the temple 100 itself, as is better described hereinbelow.

Figure 5:
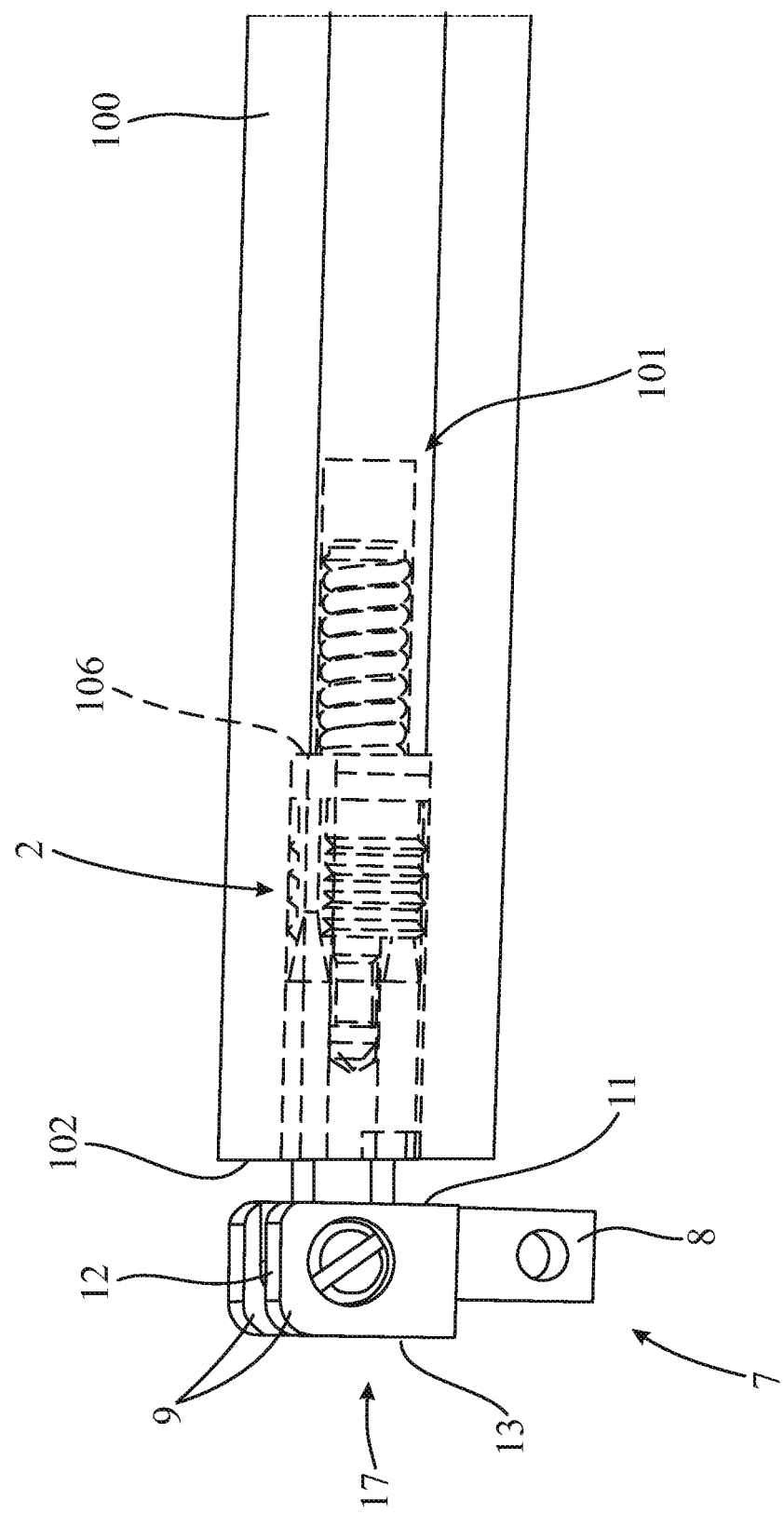
FIG. 5 shows a perspective view of a first step of inserting the elastic hinge of FIG. 1 in a first seat made in the temple; in particular.

In operation, in the aforesaid first insertion step, the first articulation element 2 is initially arranged with the expander body 28 placed in the aforesaid non-operative position A and is inserted in the first seat 101 of the temple 100 up to bringing the rear surface 25 of the guide portion 23 of the anchorage body 22 in abutment against a shoulder 106 suitably made in the first seat 101 itself (see the enclosed FIG. 5).

Subsequently, the elastic carriage 3 of the first articulation element 2 is further inserted within the first seat 101, in order to thrust the elongated portion 5 to slide through the through hole 24 of the guide portion 23 and in order to thrust the expander body 28 to be inserted between the retention portions 26 of the anchorage body 22, deforming them up to embedding the projecting teeth 27 in the plastic material constituting the temple 100.

Advantageously, moreover, the projecting teeth 27, and preferably the entire anchorage body 22, of the retention element 6 are made of metal material, provided with a greater hardness level than that of the plastic material constituting the temple 100, so to be able to easily embed in such plastic material and be firmly grasped thereby in order to retain the first articulation element 2 in the temple 100.

The retention element 6 thus conceived is particularly adapted to allow the engagement of the first articulation element 2 with a temple 100 attained by means of a process of three-dimensional molding of plastic material. Indeed, the projecting teeth 27 of the aforesaid retention element 6 are adapted to make, in the plastic of the temple 100 that is not yet deformed, housings with which they remain gripped and from which they are unable to exit outward due to the low elastic return of the plastics employed in the three-dimensional molding processes of known type.

Of course, without departing from the protective scope of the present patent, the elastic hinge 1 provided with the aforesaid retention element 6 can be associated on an eyeglass frame made with any one production process, also different from three-dimensional molding, and made of any one material, as long as the projecting teeth 27 are provided with a hardness such to be able to embed in such material.

Advantageously, it is also possible to associate the aforesaid elastic hinge 1 with a temple 100 made of a material provided with a hardness equal to or greater than that of the projecting teeth 27 which therefore are unable to embed therein (e.g. in the case of a temple 100 made of metal). Advantageously, in such case it will suffice to make the first seat 101 already provided with suitable housings for the projecting teeth 27, in which the projecting teeth 27 themselves are susceptible of being inserted following the deformation of the retention portions 26.

Hereinbelow, the method is described for the assembly of elastic hinges on an eyeglass frame, and in particular for the assembly of elastic hinges of the type described above, and regarding which—for the sake of description simplicity—the same reference nomenclature will be employed.

According to the invention, the present method comprises a step of arranging two elastic hinges 1, each of which provided at least with a first and a second articulation element 2, 7, as well as with a hinge pin 10, placed as a rotatable connection between the first and the second articulation element 2, 7.

As indicated above relative to the elastic hinge 1, the first articulation element 2 is mainly extended along a first longitudinal axis Y and is provided with at least one elastic carriage 3 provided with at least one first hole 31. In addition, the second articulation element 7 is provided with an extension along a second longitudinal axis X and is provided with at least one second hole 14. The hinge pin 10 is then placed to traverse the aforesaid first and second hole 31, 14 in order to rotatably connect the first and the second articulation element 2, 7 around a hinging axis Z perpendicular to the first and second longitudinal axis Y, X.

According to the invention, the present method also provides for a step of arranging an eyeglass frame, with which the elastic hinge 1 is intended to be associated. The aforesaid eyeglass frame is provided with two temples 100 and with a front (not shown in the enclosed figures), which is provided with two lateral end pieces 200, each of which intended to be mechanically associated with a corresponding temple 100 by means of the elastic hinge 1.

In addition, in each temple 100, a first seat 101 is obtained, in which the first articulation element 2 is intended to be inserted. In each said end piece 200, a second seat 201 is obtained which is susceptible of being opposed to a corresponding first seat 101 with the temple 100 associated with the end piece 200, and in which the second articulation element 7 is intended to be inserted.

According to the invention, the present method then provides for a first step of at least partial insertion of the first articulation element 2 in the first seat 101 of the temple 100 (see the enclosed FIGS. 5 and 6) and a (successive) second step of inserting the second articulation element 7 in the second seat 201 of the end piece 200, with the elastic hinge 1 which acts as a rotatable connection between the temple 100 and the end piece 200 (see the enclosed FIG. 8). More in detail, in the aforesaid first insertion step, the first articulation element 2 is inserted in the first seat 101 starting from the widened termination 51 of its elongated portion 5 and subsequently is thrust inside the first seat 101 with its first longitudinal axis Y substantially parallel to the longitudinal extension axis of the temple 100.

Advantageously, in such first insertion step, there is also the slidable engagement of the first articulation element 2 with the temple 100. In operation, in fact, during the first insertion step, the elastic carriage 3 is adapted to deform the retention element 6, radially expanding it in order to engage it, at at least one of the internal walls of the first seat 101, with the temple 100.

More in detail, the aforesaid first insertion step comprises a first stage, in which the first articulation element 2 is thrust within the first seat 101 up to bringing the rear surface 25 of the guide portion 23 of the anchorage body 22 in abutment against a shoulder 106 suitably obtained inside the first seat 101, as represented in the enclosed FIG. 5. Advantageously, in such first stage, the expander body 28 of the first articulation element 2 is placed in the non-operative position A, in which it does not interfere with the anchorage body 22 and in particular does not interfere with its retention portions 26, which therefore do not engage the internal walls of the first seat 101.

Figure 6:
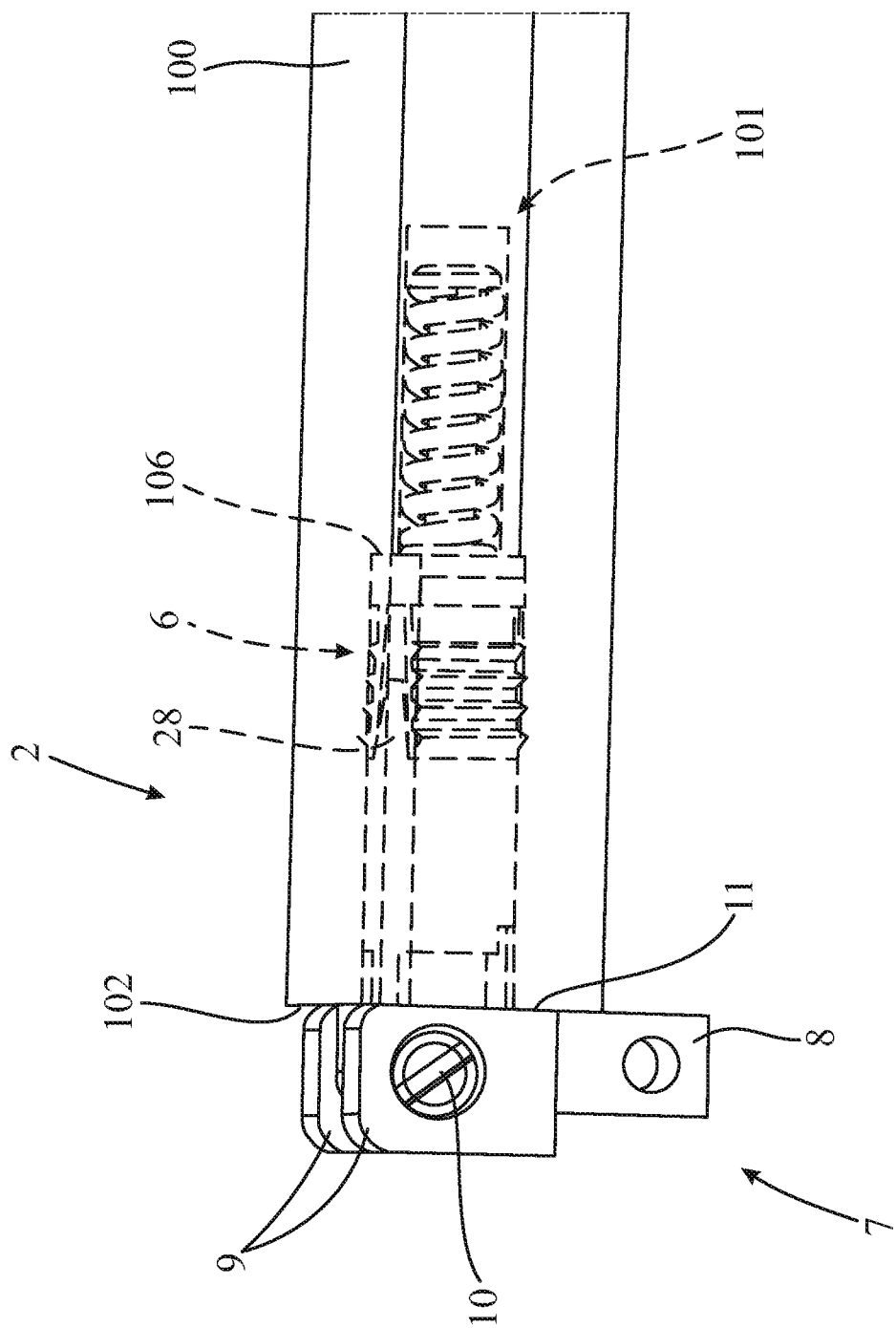
FIG. 6 shows a perspective view of a second stage of the first step of inserting the elastic hinge of FIG. 1 in the first seat made in the temple, in which the retention element of the elastic hinge is deformed and placed in an operative position B in which it interferes with the internal walls of the first seat in order to retain the elastic hinge at its interior.
Figure 7:
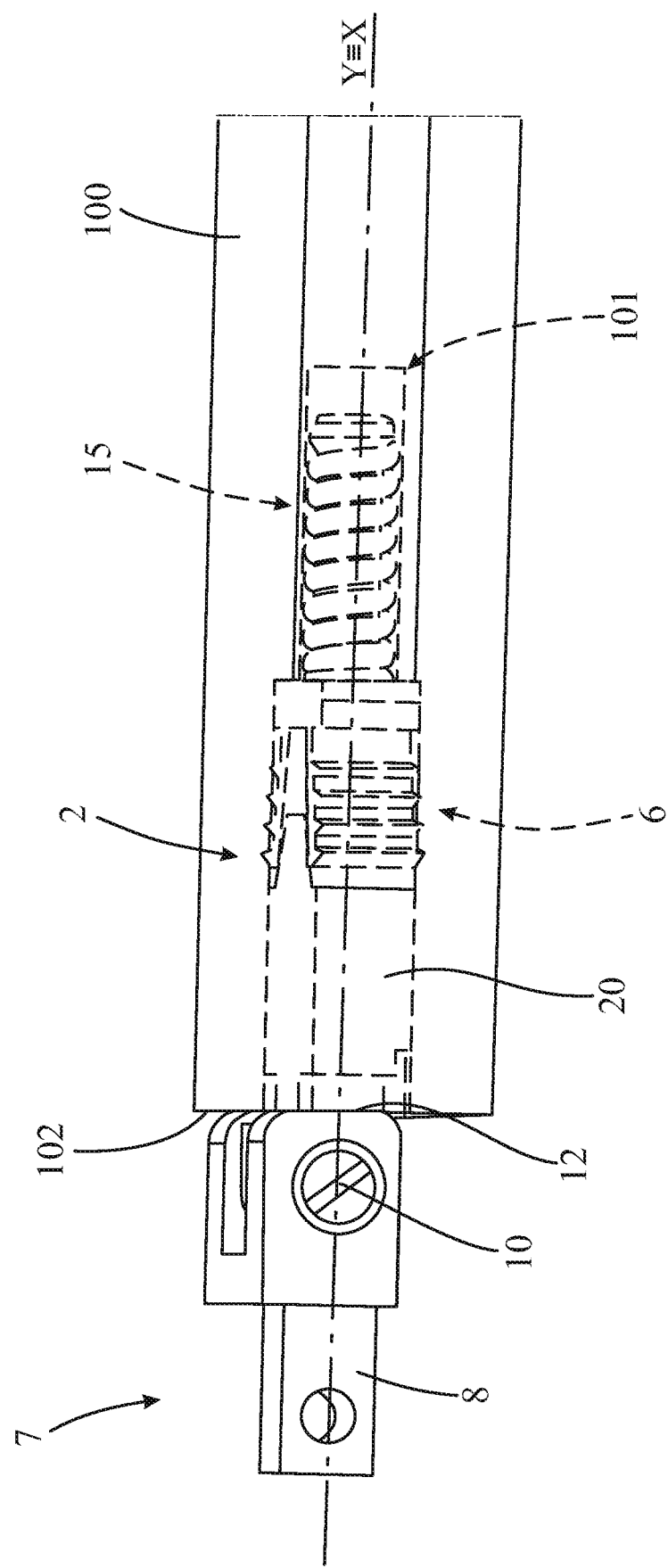
FIG. 7 shows a perspective view of a tensioning step of the present method.

Subsequently, the first insertion step comprises a second stage, illustrated in FIG. 6, in which the first articulation element 2 is further thrust within the first seat 101. In particular, in such second stage, the elastic carriage 3 is thrust along the first seat 101, while the anchorage body 22 of the retention element 6 remains stopped, in abutment against the shoulder 106 of the first seat 101.

In such second stage, therefore, the elongated portion 5 of the elastic carriage 3 is brought to slide through the through hole 24 of the guide portion 23 of the anchorage body 22 with the central body 20 of the elastic carriage 3 which slides together with the elongated portion 5. Advantageously, the movement of the central body 20 consequently thrusts the expander body 28 up to inserting the latter between the retention portions 26 of the anchorage body 22.

In operation, then, in such second stage of the first insertion step, the expander body 28 is thrust up to being placed in the operative position B, in which it interferes with the retention portions 26 of the anchorage body 22 in order to deform them, radially expanding them with respect to the first longitudinal axis Y towards at least one internal wall of the first seat 101, and engaging the projecting teeth 27 with the temple 100.

Advantageously, in this manner, the anchorage body 22 of the retention element 6 is firmly engaged with the temple 100, and the elastic carriage 3 is free to slide with respect to the anchorage body 22, outward from the first seat 101 in order to allow the elastic hinge 1 to be moved from the closed position towards the open position, up to the extra-open position.

Advantageously, the first insertion step thus conceived allows an easy engagement of the first articulation element 2 with the temple 100, which can also be made by non-specialized personnel.

According to the idea underlying the present invention, following the aforesaid first insertion step, the second articulation element 7 is placed in a mounting position with its second longitudinal axis X substantially perpendicular to the first longitudinal axis Y of the first articulation element 2.

More in detail, as indicated above, once the elastic hinge 1 is assembled with the eyeglass frame, the temple 100 is adapted to rotate at least between the closed position and the open position. In particular, in the aforesaid closed position, the temple 100 is collected on the front of the eyeglass frame, with the second longitudinal axis X of the second articulation element 7 substantially perpendicular to the first longitudinal axis Y of the first articulation element 2. In addition, in the aforesaid open position, the temple 100 is substantially placed at right angle with respect to the front of the eyeglass frame, and the second longitudinal axis X of the second articulation element 7 is substantially parallel to the first longitudinal axis Y of the first articulation element 2 (as is depicted in the enclosed FIGS. 7, 8).

In the aforesaid mounting position, therefore, the second articulation element 7 is placed with its second longitudinal axis X substantially at right angle with respect to the first longitudinal axis Y, and in particular is directed in opposite direction with respect to the closed position (as is depicted in the enclosed FIGS. 1-6).

For example, when the second articulation element 7 is in the mounting position, its second longitudinal axis X is rotated (around the hinging axis Z) substantially by 180° with respect to the position that such second longitudinal axis X assumes when the temple 100 is placed in the closed position.

According to the idea underlying the present invention, moreover, following the first insertion step, the second articulation element is placed with its second hole 14 spaced from the temple 100, and in particular from its front face 102, by a first distance D1.

Advantageously, in fact, in the first insertion step, the first articulation element 2 is inserted in the first seat 101 of the temple 100 up to bringing the second articulation element 7 in abutment against the temple 100 itself. More in detail, in the aforesaid second stage of the first insertion step, the elastic carriage 3 is thrust inside the first seat 101 up to bringing the shoulders 9 of the second articulation element 7, rotatably connected therewith, in abutment against the front face 102 of the temple 100, and in particular up to bringing the first face 11 of the cam profile 17 of each shoulder 9 in abutment against the front face 102 (see the enclosed FIG. 6).

According to the idea underlying the present invention, the present method also comprises a tensioning step, preceding the second step of inserting the second articulation element 7 in the second seat 201 of the end piece 200 (and subsequently preceding the first step of inserting the first articulation element 2 in the first seat 101 of the temple 100). More in detail, in the aforesaid tensioning step, the second articulation element 7 is rotated (e.g. 90°) around the hinging axis Z up to bringing its second longitudinal axis X parallel to the first longitudinal axis Y of the first articulation element 2, as indicated in the enclosed FIG. 7.

In addition, in the aforesaid tensioning step, the second articulation element 7 is rotated around the hinging axis Z up to bringing its second hole 14 to a second distance D2 from the temple 100 (and in particular from the front face 102 of the latter) greater than the first distance D1.

In particular, in the aforesaid tensioning step, the second articulation element 7 is rotated in a manner such to place the elastic hinge 1 in the open position, with the first and the second articulation elements 2, 7 placed substantially aligned with each other and with the second face 12 of the cam profile 17 in abutment against the front face 102 of the temple 100.

During the aforesaid rotation, attained in the tensioning step, the second articulation element 7 is also brought to act thrustingly against the temple 100 in order to force the elastic carriage 3 of the first articulation element 2 to slide outward from the first seat 101 for a tensioning travel. More in detail, in the aforesaid tensioning step, the cam profile 17 of the second articulation element 7 is adapted to abut against the front face 102 of the temple 100 and to act thrustingly against the latter in order to move the hinging axis Z away from the temple 100 itself and in order to force the elastic carriage 3, rotatably mounted thereon, outward from the first seat 101.

Indeed, as indicated above, the first face 11 of the cam profile 17 is brought close to the hinging axis Z with respect to the second face 12. In operation, then, by rotating the second articulation element 7 from the mounting position to the open position, the hinging axis Z is moved away from the temple 100 and consequently the elastic carriage 3 is brought to partially exit from the first seat 101.

Advantageously, in this manner, the elastic element 15 of the elastic carriage 3 is susceptible of being elastically deformed during the tensioning step and in particular is susceptible of being placed under tension in order to execute a preloading operation of the elastic hinge 1, by means of which the elastic element 15 results taut during the entire normal use of the eyeglass frame, in order to always exert an elastic return force aimed to bring the elastic carriage 3 within the first seat 101. Advantageously, such preloading operation is extremely simple to execute, since it only requires rotating the second articulation element 7 with respect to the first articulation element 2, hence it can be executed also by non-specialized personnel.

As indicated above, the present method also comprises a second step of inserting the second articulation element 7 in the second seat 201 of the end piece 200. Advantageously, the aforesaid second seat 201 is provided with at least two open faces in order to allow the first articulation element 2, rotatably connected to the second articulation element 7, to be rotated around the hinging axis Z between the closed position and the open position. More in detail, the second seat 201 is advantageously provided with at least one first open face, intended to be opposite the temple 100 with the latter placed in closed position, and with a second open face, intended to be opposite the temple 100 with the latter placed in open position.

In operation, in the aforesaid second insertion step, the second articulation element 7 is thus intended to be inserted with the third face 13 of the cam profile 17 thereof placed at the first open face of the second seat 201, and with the second face 12 of the cam profile 17 thereof placed at the second open face of the second seat 201 in order to allow the second and third face 12, 13 to abut against the temple 100 in the open and closed positions. Advantageously, moreover, in the aforesaid second insertion step, the second articulation element 7 is inserted with the first face 11 of its cam profile 17 placed at an internal wall of the second seat 201, in order to prevent such first face 11 from returning in abutment against the temple 100, once the elastic hinge 1 is associated with the eyeglass frame.

Advantageously, moreover, the present method comprises at least one step of fixing the second articulation element 7 in the second seat 201 of the end piece 200, subsequent to the second insertion step. In particular, such fixing step provides for mechanically engaging the second articulation element 7 with the end piece 200 by means of the fixing screw 19, which is screwed in the through hole 205 of the end piece 200 and in the threaded hole 18 of the second articulation element 7, and such holes 205, 18 are suitably placed aligned with each other.

In operation, the fixing step provides for inserting the fixing screw 19 in the through hole 205 and for screwing it in the threaded hole 18, up to bringing the head of the fixing screw 19 in abutment against the end piece 200, thus retaining the second articulation element 7 with the end piece 200.

Advantageously, the aforesaid through hole 205 can be made simultaneous with the making of the same end piece 200, or it can be made at a later time, and in particular it can be made by the same fixing screw 19 in the aforesaid fixing step.

The elastic hinge 1 and its method of assembly on an eyeglass frame thus conceived therefore attain the pre-established objects.

The contents of the Italian patent application number 102019000003847, from which this application claims priority, are incorporated herein by reference.

The invention claimed is:

1. A method for the assembly of elastic hinges on an eyeglass frame, the method comprising:
   a step of arranging two elastic hinges (1), each provided with:
      a first articulation element (2) having a main extension along a first longitudinal axis (Y) and provided with an elastic carriage (3) provided with at least one first hole (31);
      a second articulation element (7) having an extension along a second longitudinal axis (X) and provided with at least one second hole (14);
      a hinge pin (10) placed to traverse said first hole (31) and said second hole (14) in order to rotatably connect said first articulation element (2) and said second articulation element (7) around a hinging axis (Z) perpendicular to said first longitudinal axis (Y) and said second longitudinal axis (X);
   a step of arranging an eyeglass frame provided with:
      two temples (100), a first seat (101) made in each of these;
      a front provided with two lateral end pieces (200), each of which intended to be mechanically connected to a corresponding said temple (100) by means of a corresponding said elastic hinge (1); in each said end piece (200), a second seat (201) being obtained that is susceptible of opposing the first seat (101) of the corresponding said temple (100) with said temple (100) connected to said end piece (200);
   a first step of inserting said first articulation element (2) in the first seat (101) of said temple (100);
   a second step of inserting said second articulation element (7) in the second seat (201) of said end piece (200) with said elastic hinge (1) which acts as a rotatable connection between said temple (100) and said end piece (200);
wherein:
   following said first insertion step, said second articulation element (7) is placed in a mounting position with said second longitudinal axis (X) substantially perpendicular to said first longitudinal axis (Y) and with said second hole (14) spaced from said temple (100) by a first distance (D1);
   before said second step of inserting said second articulation element (7) in the second seat (201) of said end piece (200), a tensioning step is provided, in which said second articulation element (7) is rotated around said hinging axis (Z) up to bringing said second longitudinal axis (X) parallel to said first longitudinal axis (Y) with said second hole (14) spaced from said temple (100) by a second distance (D2) greater than said first distance (D1); during the rotation of second articulation element (7), said second articulation element (7) being brought to act thrustingly against said temple (100) in order to force the elastic carriage (3) of said first articulation element (2) to slide outward from said first seat (101) for a tensioning travel.

2. The method of claim 1, wherein, with said elastic hinge (1) assembled with said eyeglass frame, said temple (100) is adapted to rotate at least between:
   a closed position, in which said temple (100) is collected on the front of the eyeglass frame, with the second longitudinal axis (X) of said second articulation element (7) substantially perpendicular to the first longitudinal axis (Y) of said first articulation element (2); and
   an open position, in which said temple (100) is substantially placed at a right angle with respect to the front of the eyeglass frame, with the second longitudinal axis (X) of said second articulation element (7) substantially parallel to the first longitudinal axis (Y) of said first articulation element (2);
wherein, in said mounting position, said second articulation element (7) is placed with said second longitudinal axis (X) substantially perpendicular to said first longitudinal axis (Y) and is directed in opposite direction with respect to said closed position.

3. The method of claim 1, wherein, in said first insertion step, said first articulation element (2) is inserted in the first seat (101) of said temple (100) up to bringing said second articulation element (7) in abutment against said temple (100);
   said second articulation element (7) being provided with a cam profile (17) adapted to abut against said temple (100) and to thrustingly act against the latter in said tensioning step in order to move said hinging axis (Z) away from said temple (100) and force said elastic carriage (3) outward from said first seat (101).

4. The method of claim 1, wherein the elastic carriage (3) of said first articulation element (2) comprises at least one elastic element (15) susceptible of being elastically deformed during said tensioning step in order to be placed under tension.

5. The method of claim 1, wherein said first articulation element (2) is provided with at least one retention element (6) placed around said elastic carriage (3) and susceptible of being engaged by means of retention relationship to at least one internal wall of the first seat (101) of said temple (100);

during said first insertion step, said elastic carriage (3) being adapted to deform said retention element (6), radially expanding said retention element (6) in order to engage said retention element (6) with at least one internal wall of the first seat (101) of said temple (100).

6. The method of claim 1, wherein said second articulation element (7) is provided with a threaded hole (18) and said end piece (200) is provided with at least one through hole (205) which is extended between an external wall of said end piece (200) and said second seat (201) and is intended to be aligned with said threaded hole (18) when said second articulation element (7) is inserted in said second seat (201);

following said second insertion step, said method providing for at least one step of fixing said second articulation element (7) in the second seat (201) of said end piece (200) by means of screwing a fixing screw (19) in said through hole (205) and in said threaded hole (18) positioned aligned with each other.

7. The method of claim 2, wherein, in said second insertion step, said second articulation element (7) is inserted in the second seat (201) of said end piece (200), and such second seat (201) is provided with:

a first open face, intended to be opposite said temple (100) when said temple (100) is placed in said closed position; and a second open face, intended to be opposite said temple (100) when said temple (100) is placed in said open position in order to allow said first articulation element (2), rotatably connected to said second articulation element (7), to be rotated around said hinging axis (Z) between said closed position and said open position.

\* \* \* \* \*